Jan. 30, 1968

J. H. DALE 3,366,168

SOLAR HEATER ROOF DRAINER

Filed Oct. 6, 1965

INVENTOR
JOHN H. DALE

BY Beaman & Beaman

ATTORNEYS

United States Patent Office 3,366,168
Patented Jan. 30, 1968

3,366,168
SOLAR HEATER ROOF DRAINER
John H. Dale, Rte. 1, Houghton Lake, Mich. 48629
Filed Oct. 6, 1965, Ser. No. 493,474
3 Claims. (Cl. 165—47)

ABSTRACT OF THE DISCLOSURE

The invention relates to a device of heat-absorbing material removably attached to the overhang of roofs so as to project beyond the normal accumulation of snow on the roof and to provide water drainage through the ice accumulation on the overhang.

---

Figure 1:
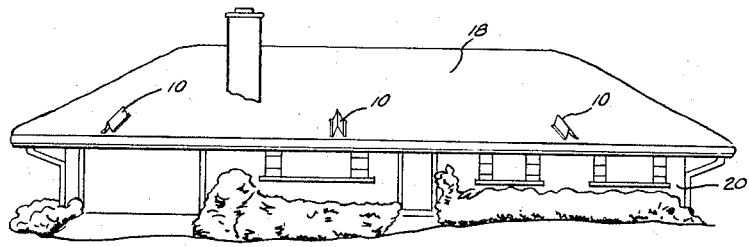

In localities in which there is substantial snowfall the snow will melt above the eaves, under certain conditions of outside temperatures and roof insulation, and the melted snow will then freeze on the overhanging portion of the roof adjacent the eaves. The resulting accumulation of ice will act as a dam which may cause rain and melting snow flowing down the roof to back up and flow through the shingles adjacent the overhanging portion of the roof.

To overcome the problem stated above, it has been proposed to use electrical heating tape which is applied along the overhanging portion to melt the accumulation of ice.

According to the present invention, it is proposed to employ solar heat to maintain drainage passages through the ice accumulation on the roof overhang to prevent water damage to the interior of a building.

Thus, an object of the invention is to provide a solar heating unit for roofs in the form of a heat absorbing fin projecting upwardly through the snow falling upon the overhang of the roof and functioning to maintain a melted passage for drainage of water through an ice accumulation on the roof overhang.

Another object is to provide a solar heater of the type described which may be applied to the roof by unskilled persons and which may be readily removed and reinstalled as dictated by seasonal conditions.

Another object of the invention is to provide a solar heating device for roofs which will function to melt ice accumulation in localized areas and then maintain drainage across the ice accumulation.

Figure 2:
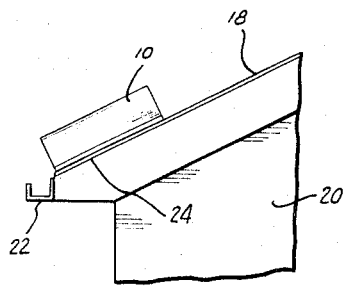
Figure 3:
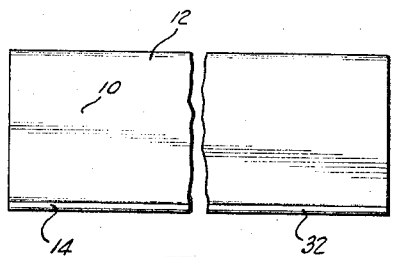
Figure 4:
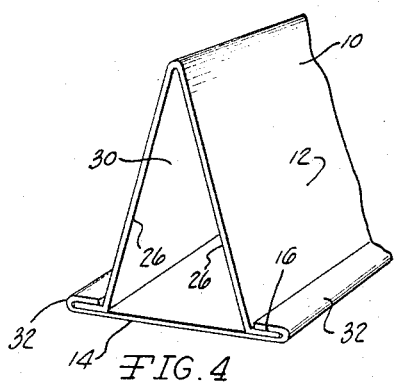
Figure 5:
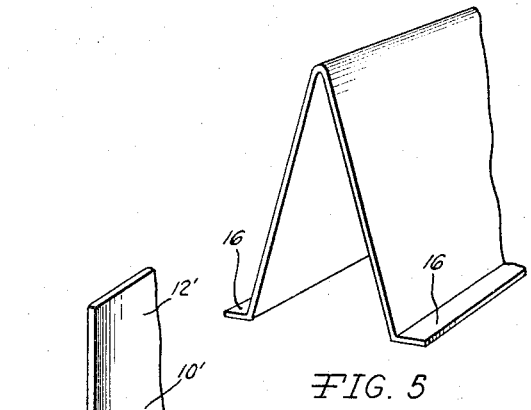
Figure 6:
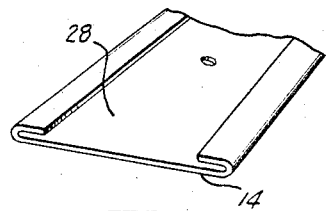
Figure 7:
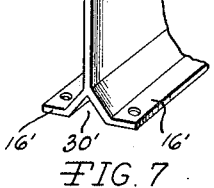

These and other objects and advantages will more fully appear from the following specification and appended claims:

In the drawings,

FIG. 1 is a front elevational view of a dwelling showing the solar heater applied to the overhang of the roof, FIG. 2 is a fragmentary, side-elevational view of the dwelling of FIG. 1 showing the heater in side-elevation on the roof overhang, FIG. 3 is a broken, side-elevational view of the heater shown removed from the roof, FIG. 4 is a fragmentary perspective view of the heater as viewed from the end, FIG. 5 is a view similar to FIG. 4 of the heater fin removed from its base, FIG. 6 is a view similar to FIG. 4 of the heater base, and FIG. 7 is a modified form of the invention in the form of an extrusion.

In practice, the solar heater 10 of the present invention takes the form of metal structure having a fin 12 and a base 14. Fin 12 may have a length in the order of 24" to 36" and a height in the order of 6" to 9". The length will depend upon the extent of the roof overhang and the height will depend upon the average depth of snowfall in the locality in which the heater 10 is to be used.

To enable the fin 12 and base 14 to function efficiently, the surfaces exposed to the sun should be such that they will absorb rather than reflect the solar heat. Thus, such surfaces are preferably black in color and they may be painted, enameled, anodized, etc., with a black or other heat-absorbing surface.

As shown, the fin 12 is fabricated from a relatively light gauge sheet of aluminum bent into an inverted V having flanges 16. The base 14 is preferably of sheet aluminum formed into a flat channel into which the flanges 16 of the fin 12 may be slid with a relatively tight fit.

In applying the heater 10 to the roof 18 of the dwelling 20, the base 14 is first nailed into position at 90° to the eaves 22 and running from the eaves 22 transversely of the overhang 24 to a point on the roof overlying that portion of the roof which is heated from the interior of the dwelling 20. The fin 12 is then inserted into the base 14, the sides 26 being sprung toward each other to enable the flanges 16 to enter the channel 28. When released, the spring of the metal of the fin 12 will hold the fin 12 in a firm, nonrattle position in the base 14 yet enable the fin 12 to be removed and stored pending the winter months.

It will be noted that the sides 26 form, with the base 14, a longitudinal opening 30 through which drainage may take place from the upper end of the heater 10 to the lower end adjacent the eaves 22. As long as the upper edge of the fin 12 is exposed to solar heat, such heat will be absorbed and will flow into the lower areas of the heater 10 melting any accumulation of ice and snow in contact with the metal surfaces of the heater 10. In this manner, drainage of melted snow and rain across the roof overhang is assured.

Referring to FIG. 7, a modified form of solar heater 10' is shown in the form of a metallic extrusion, preferably of aluminum, having a black anodized or painted surface. Leg portions 16' rest upon the roof and they are provided with holes 32 for receiving nails or other means for securing the same to the roof. Beneath the fin portion 12' is an inverted V channel which forms a longitudinally extending passage for drainage from above the roof overhang.

In addition to the drainage which takes place from the upper ends of the heater 10 and 10', it will be understood that drainage also takes place along the sides of the heater. Heater 10 provides drainage between the flanges 16 and the channel portion 32 of the base 14. Heater 10' has its legs 16' in bridging relation across the ends of the roof shingles to enable lateral drainage to take place along the heater 10' into the longitudinal drainage area.

Having thus described my invention, what I claim as new and desire to protect by Letters Patent is:

1. In combination with a sloping roof having an overhang the underside of which is exposed to atmospheric temperatures, a roof accessory attached to the upper surface of said overhang to provide water drainage along the slope of said roof and across said overhang, said accessory taking the form of an elongated solar heater of heat-absorbing and tranferring material having an upright fin of a height sufficient to project above an average accumulation of snow on said overhang so as to be exposed to solar heat, said heater having a base portion extending along its longitudinal axis for supporting said fin in upright position when disposed in the direction of the slope of said overhang and of a length to extend across said overhang, said base and fin collectively defining a drainage passage along said longitudinal axis.

2. In the combination as defined in claim 1 wherein said fin and base portions are separable.

3. In the combination as defined in claim 1 wherein said fin and base portions are in the form of an integral section.

References Cited

UNITED STATES PATENTS

| | | | |
|---|---|---|---|
| 3,001,331 | 9/1961 | Brunton | 126—270 |
| 3,207,211 | 9/1965 | Winterfeldt | 165—47 |

ROBERT A. O'LEARY, *Primary Examiner.*

CHARLES SUKALO, *Examiner.*